P. NEILL.
ESCAPEMENT DEVICE.
APPLICATION FILED NOV. 25, 1914.

1,274,749.

Patented Aug. 6, 1918.

WITNESSES:

INVENTOR
Paul Neill.
BY
ATTORNEY

UNITED STATES PATENT OFFICE.

PAUL NEILL, OF EAST ORANGE, NEW JERSEY, ASSIGNOR TO WESTINGHOUSE ELECTRIC AND MANUFACTURING COMPANY, A CORPORATION OF PENNSYLVANIA.

ESCAPEMENT DEVICE.

1,274,749.    Specification of Letters Patent.    Patented Aug. 6, 1918.

Application filed November 25, 1914.   Serial No. 874,021.

*To all whom it may concern:*

Be it known that I, PAUL NEILL, a citizen of the United States, and a resident of East Orange, in the county of Essex and State of Pennsylvania, have invented a new and useful Improvement in Escapement Devices, of which the following is a specification.

My invention relates to escapement devices and it has particular reference to escapement devices for electrical measuring instruments.

One object of my invention is to provide an escapement device that will be inexpensive to manufacture and simple in its operation.

Another object of my invention is to provide an escapement device for electrical measuring instruments that will operate correctly irrespective of the direction of rotation of the armature of the instrument.

My invention is primarily intended for utilization in watthour meters but it is adapted for a much wider application. It is to be understood that the references to watthour meters in the following description do not limit the applications of the invention.

Heretofore, it has been necessary to utilize a complicated double ratchet escapement to prevent an integrating watthour meter from indicating incorrectly when the armature of the same was reversed in its direction of rotation.

I provide a grooved wheel having alternate notches that successively releases the teeth of a spring tensioned escapement wheel. My invention, as will be seen from the following description, will permit the escapement wheel to turn in one direction, irrespective of the direction of rotation of the grooved wheel.

Figure 1:
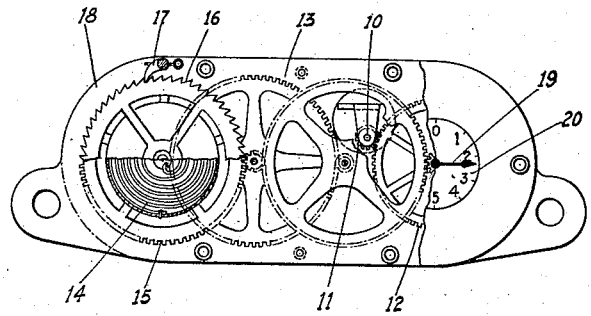
Figure 2:
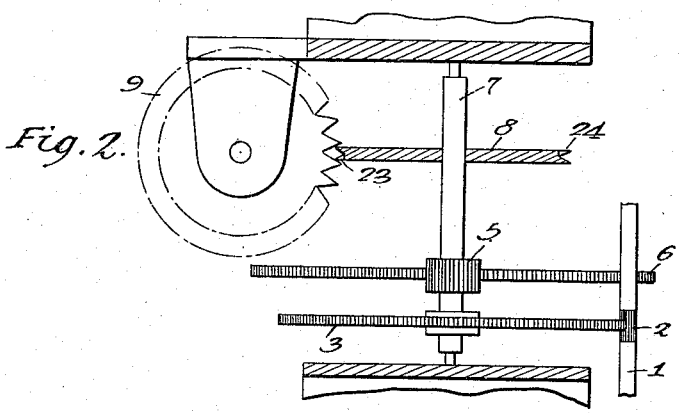
Figure 3:
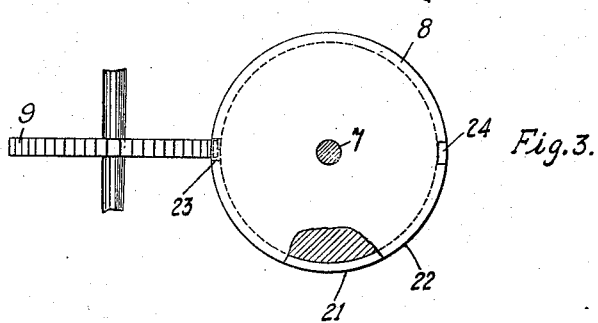

In the accompanying drawings, Figure 1 is a front view, with parts broken away, of an integrating mechanism for watthour meters embodying my invention; Fig. 2 is a detail rear view, shown partially in elevation and partially in section, of an escapement mechanism embodying my invention and Fig. 3 is a top detail view of the escapement mechanism shown in Fig. 2.

A main shaft 1 of an electrical measuring instrument (not shown) is provided with a pinion 2 that engages a gear wheel 3 which is mounted on a shaft 4 with a pinion 5. The pinion 5 engages a gear wheel 6 that is mounted on a shaft 7 with a grooved wheel 8. The grooved wheel 8 engages an escapement wheel 9 that is mounted on a shaft 10. A pinion 11 is also mounted on the shaft 10 and engages a gear wheel 12 of an integrating mechanism 13. A coil spring 14 that has its inner end connected to a gear wheel 15 of the integrating mechanism 8 and its outer end connected to a ratchet wheel 16 is provided to maintain the escapement wheel 9 continuously under tension. A retaining pawl 17 is attached to the frame 18 of the integrating mechanism 13 and is adapted to engage the ratchet wheel 16 for the purpose of preventing the spring 14 from unwinding at its outer end. The integrating mechanism 13 operates a plurality of pointers 19 that coöperate with scales 20 to indicate the integrated value of the power being measured.

The grooved wheel 8 is provided with flanges 21 and 22 that have notches 23 and 24, respectively, therein. The notches are so located that they are alternately in the one and the other of the flanges.

When the shaft 1 rotates, it operates the grooved wheel 8 at a speed that is proportional to the speed of rotation of the armature (not shown). Each tooth of the escapement wheel 9 successively bears on the flanges 21 and 22 and when a tooth encounters either the notch 23 in the flange 21 or the notch 24 in the flange 22, the escapement wheel 9 is permitted to be turned by the action of the spring 14, a distance represented by the distance between the bearing surfaces on the flanges, thus permitting the integrating mechanism 13 to operate and the pointers 19 to indicate correctly. It will be understood that, irrespective of the direction of rotation of the shaft 1, the grooved wheel 8 will permit the escapement wheel 9 to turn in but one direction depending upon the direction of application of the force from the spring 14. Thus, if the meter is so connected that its armature rotates backwardly, the pointers 19 will indicate correctly.

The grooved wheel 8 may, of course, be provided with any number of flanges and may have any number of notches therein, depending upon the speed of escapement desired.

While I have shown my invention with respect to watthour meters, it is not so limited, but is applicable to various applications within the scope of the appended claims.

I claim as my invention:

1. An integrating device for a measuring instrument comprising a toothed escapement wheel, indicators operatively connected to the escapement wheel, a spring adapted to move the escapement wheel in one direction only, and a grooved wheel having a notch cut in each of its flanges on opposite radii thereof and adapted to be driven continuously in either direction, said grooved wheel being adapted to engage the teeth of the escapement wheel and the notches being adapted to release the escapement wheel to actuate the indicators in one direction, irrespective of the direction of movement of the grooved wheel.

2. An integrating device for a measuring instrument comprising a toothed escapement wheel tensioned to move in one direction only, indicators operatively connected to the said wheel, and a grooved wheel having a notch cut in each of its flanges on opposite radii thereof and adapted to be driven continuously in either direction by the measuring instrument, the notches being adapted to release the escapement wheel to actuate the indicators in one direction, irrespective of the direction of movement of the grooved wheel.

3. An integrating mechanism comprising a toothed escapement wheel tensioned to move in one direction only, an indicator operatively connected to the escapement wheel, and a continuously operated wheel having two flanges with notches cut therein on opposite radii thereof, said escapement wheel being adapted to be released by the notches in the said flanged wheel to actuate the indicator in one direction, irrespective of the direction of movement of the flanged wheel.

4. An escapement mechanism comprising a grooved wheel having a plurality of notches cut in its flanges on opposite radii thereof and adapted to rotate continuously in either direction of rotation, and a spring-tensioned toothed escapement wheel for engaging the same grooved wheel at right angles, said escapement wheel being permitted to turn in one direction irrespective of the direction of rotation of the said grooved wheel.

5. An escapement mechanism comprising a toothed escapement wheel tensioned to move in one direction, and a grooved wheel having notches cut in its flanges on opposite radii thereof and adapted to move continuously in either direction, said grooved wheel being adapted to engage the teeth of the escapement wheel and the notches being adapted to release the escapement wheel in accordance with the speed of rotation of the grooved wheel.

6. A mechanism for a measuring instrument comprising an escapement wheel tensioned to move in one direction only, an indicator operatively connected to the escapement wheel, and a continuously operated wheel having two flanges provided with notches in its respective flanges on opposite radii thereof, said escapement wheel being adapted to be released by the notches in the said flanged wheel to actuate the indicator in one direction, irrespective of the direction of movement of the flanged wheel.

In testimony whereof, I have hereunto subscribed my name this 16th day of November, 1914.

PAUL NEILL.

Witnesses:
HENRY MILLER,
D. H. KULP.

Copies of this patent may be obtained for five cents each, by addressing the "Commissioner of Patents, Washington, D. C."